May 31, 1960     D. R. HERRIOTT     2,938,424
REFLECTION SENSING SYSTEM

Filed July 11, 1957     2 Sheets-Sheet 1

INVENTOR
D. R. HERRIOTT
BY
H. O. Wright
ATTORNEY

May 31, 1960     D. R. HERRIOTT     2,938,424
REFLECTION SENSING SYSTEM
Filed July 11, 1957     2 Sheets-Sheet 2

INVENTOR
D. R. HERRIOTT
BY
H. O. Wright
ATTORNEY

United States Patent Office 2,938,424
Patented May 31, 1960

2,938,424

REFLECTION SENSING SYSTEM

Donald R. Herriott, Morristown, N.J., assignor to Bell Telephone Laboratories, Incorporated, New York, N.Y., a corporation of New York Filed July 11, 1957, Ser. No. 671,302

2 Claims. (Cl. 88—14)

This invention relates to apparatus for sensing areas of differing characteristics by the use of reflected wave energy. More particularly, it relates to apparatus employing energy of more than one wavelength for sensing, and comparing the relative amplitudes of the reflections of different wavelengths to obtain indications of the character of the surface from which reflections are instantly being received.

A principal object of the invention is, accordingly, to effect the sensing of an area by means requiring no direct mechanical or electrical contact.

A further principal object of the invention is to effect the sensing of areas of different materials on the surface of a fragile device by comparing their reflective characteristics with respect to energies of different wavelengths and thus to eliminate the hazard of damage involved where direct mechanical and/or electrical contact is required.

In the manufacture and assembly of minute sensitive devices such, for example, as semiconductive transistors proportioned to operate efficiently at high microwave frequencies, a major problem often encountered is that of determining the precise position and extent of very small areas upon which specific conductive metal coatings, such as coatings of gold and aluminum, respectively, have been deposited. Such coatings are of course intended to serve as electrical terminals of the device. To connect the device in a circuit it is necessary, as a further step, to attach minute leads or wires to make suitable electrical contact with the coatings. This necessitates accurately determining the position of each coated area so that its associated terminal lead may be suitably positioned on it. Frequently the areas are of such small dimensions and the coatings so thin that they can be observed visually only by using a microscope. This is awkward and time consuming and therefore very undesirable as a step in a manufacturing process. In some instances even the use of a microscope does not insure satisfactory results. Systems of the invention intended for the solution of this specific problem will be referred to as reflection microspectroratiometer probing systems.

Heretofore, electrical sensing means relying upon direct mechanical and electrical contact with the surface of the specimen being examined have been employed as described, for example, in Patents 2,748,235 to R. L. Wallace, Jr., and 2,748,349 to E. Dickten, Jr., R. P. Riesz and R. L. Wallace, Jr. Both patents were granted on May 29, 1956, and both are assigned to applicant's assignee. Mechanical and electrical contact for preliminary exploratory tests of such delicate devices does, however, involve appreciable hazards of impairing the physical and electrical characteristics of the devices. The need for methods and apparatus which do not involve such hazards, for accurately locating the metallic terminal coated areas on small semiconductive members has been apparent for some time.

For the specific problem indicated above, one convenient arrangement in accordance with the principles of the invention employs light beams and compares the relative amplitudes of reflected blue light and reflected red light (i.e., energy components of appreciably different frequencies) from a small spot on the surface to be explored, means being provided to, in effect, move the small spot (i.e., in effect to scan) over specific paths across the specimen and further means being provided to determine the intensity ratio between the blue and red light reflections as the spot from which the reflections are received is moved along a specific path.

Appropriate recording means to furnish, in visual, graphical or other convenient form, a record of the reflecting characteristics thus indicated greatly facilitates interpretation and utilization of the results. Effective methods of utilizing such results are disclosed, for example, in the above mentioned two patents. Large abrupt changes in the ratio signal, of course, represent boundaries so that the signal can, obviously, be directly applied to automatic or partially automatic systems which record the signal and its significant changes in a memory matrix and bring the specimen to a suitable position for attaching the lead to a specific terminal coating. A simple system of this type is disclosed in the above mentioned patent to Wallace.

It is at once apparent to those skilled in the art that the generic principles of the invention are of extremely broad scope. For example, radio waves of differing wavelengths will be reflected more or less efficiently depending upon the character and relative size of the elements of a reflecting surface so that a comparison of the relative reflected energies of two substantially differing wavelengths from a particular surface may enable an aircraft navigator to determine when the craft is approaching particular areas. Of some interest in this connection is Patent 2,247,662 granted July 1, 1941, to R. C. Newhouse, assignor to applicant's assignee. The system of this patent uses a single radio beam, the frequency of the beam being varied over a very limited range and therefore Newhouse obtains only a rough comparison of reflective changes with frequency. Obviously, more pronounced effects should be readily obtainable by scanning an area with two or more beams of substantially differing frequencies in synchronism and directly comparing their respective reflected components.

The methods and arrangements of the invention are also obviously readily adapted for numerous and varied inspection and control purposes in the fabrication of minute and sensitive elements. By way of specific example, relating particularly to the present invention, the quality and texture of a particular terminal plating and the amount of contamination of the plating will affect the amounts of energy reflected.

For the illustrative system chosen in the present application to exemplify the principles of the invention the ratio of blue to red light reflection affords effective discrimination between a semiconductive element of germanium or silicon and deposits of gold or aluminum on said element.

Obviously, for other applications other colors of light or other types of energy such as radio waves, sonic, or ultrasonic waves, heat waves or the like may be found more appropriate.

Other objects, features and advantages of the invention will become apparent during the course of the following detailed description of an illustrative system embodying in one form the principles of the invention and from the appended claims.

Figure 1:
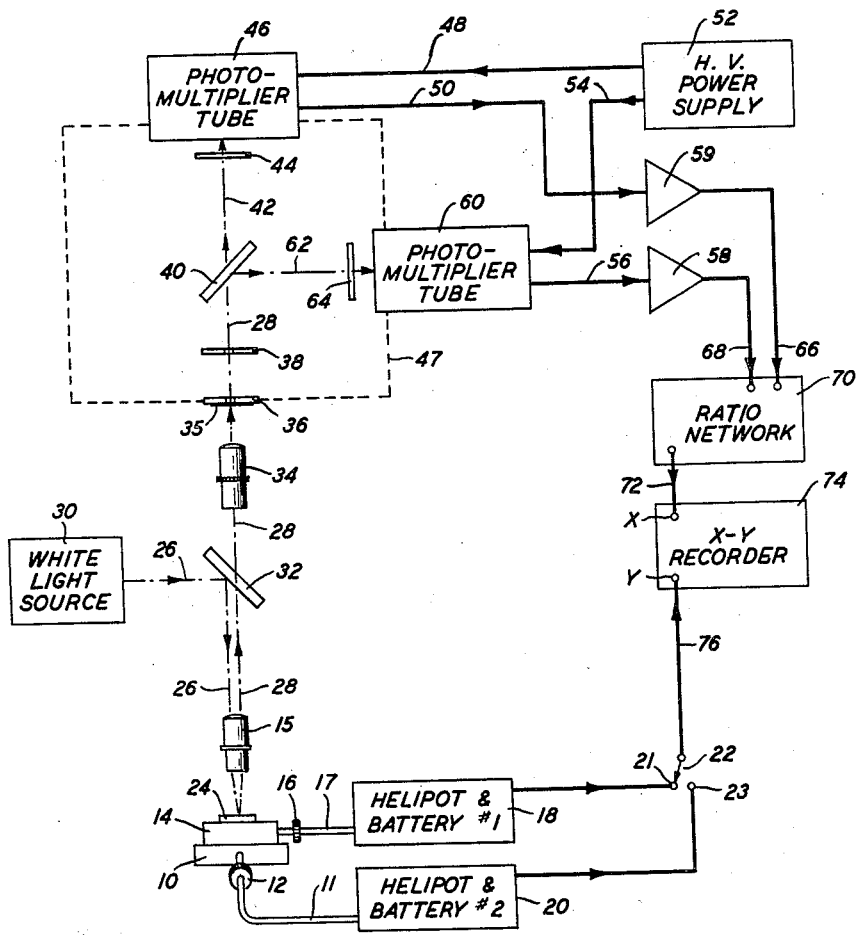
Fig. 1 illustrates in block diagrammatic form one specific system embodying the principles of the present invention.

In more detail, in Fig. 1 the specific illustrative system comprises the following components associated as described in detail below. A micromanipulator, including the crossed sliding carriages 10 and 14 is provided. These carriages in accordance with conventional practice are equipped with micrometer mechanisms, not shown, to afford a high precision control of their respective movements in the horizontal plane. Carriage 10 is adapted to be moved perpendicularly with respect to the plane of the drawing by turning knob 12 and carriage 14 is adapted to be moved parallel to the plane of the drawing by turning knob 16.

On the upper carriage 14, a specimen 24 which is to be examined is mounted. One convenient method of mounting is by means of a light coating of adhesive material on the lower surface of the specimen.

While separate sources of blue and red light, respectively, could be employed, it is obviously more convenient to employ a single source of substantially white light 30, which, obviously, should include strong red and blue components. The components are preferably of approximately equal amplitudes. Source 30 can for example, be a small tungsten filament lamp, its filament being heated to brilliant incandescence.

The beam of substantially white light 26, is reflected by a neutral beam divider 32 to impinge on the surface of specimen 24, as shown, after passing through objective lens system 15, which focuses the light beam on a small area of the surface of specimen 24.

Neutral beam divider 32 is a reflecting element such as a piece of glass coated with a semitransparent metallic film which will reflect a substantial portion of the light impinging upon it but will transmit the remainder of the light directly through it. Patent 2,724,663 granted November 22, 1955, to W. L. Bond discloses a preferred method of coating glass with a transparent metal film. In this instance, the light passing directly through divider 32 is not used and may be ignored.

Reflections, designated 28, from specimen 24 of the incident beam 26, proceed vertically through objective lens system 15 and the neutral beam divider 32. In this instance, a portion of the reflected light will be directed back toward source 30 and may be ignored.

The directly transmitted portion will impinge upon the lens system eyepiece 34. The elements 15 and 34 are preferably, for example, those of a high power microscope. The lens system comprising elements 15 and 34 focuses a greatly enlarged image 35 of the spot on the surface of specimen 24 instantly being illuminated on the lower surface of the member 36. A similar member 38 is located just above the member 36.

Members 36 and 38 are opaque but have centrally located and aligned apertures which may be small holes, that in member 36, for example, ten mils in diameter and that in member 38 being 30 mils in diameter. The aperture of member 36 selects only the reflected light from a small area of the greatly enlarged image focused on the lower surface of member 36. The aperture in member 38 passes light from eyepiece 34 which has passed through the aperture of member 36, but effectively eliminates light from other surrounding sources.

Assuming, by way of example, that lens system comprising members 34 and 15 has a magnification of one hundred and fifty times, the effect is virtually that of selecting the reflection from a spot on the surface of specimen 24 which is .00007 inch in diameter.

Where the surface is contaminated with dust or dirt or is rough and of substantially varying texture, it may be preferable to employ larger apertures instead of small pinholes, a convenient size aperture in one extreme instance, for example, being found to be twenty mils wide by 375 mils long. For most purposes a round aperture of 30 mils diameter will be preferable for member 36 and a round aperture of approximately 90 mils will be then appropriate for member 38.

The portion of beam 28 which passes through members 36 and 38 impinges on dichroic mirror 40. Mirror 40 can comprise, for example, a glass plate having deposited by evaporation on one side alternate layers of transparent films of different indices and such thicknesses that a major portion of red light is transmitted and little reflected and a major amount of blue light is reflected and little transmitted. Such devices are, of course, well understood and widely used by those skilled in the art.

Members 15 and 34 are adjustable vertically to facilitate obtaining an accurately focused image upon the lower surface of member 36. Obviously it is desirable that the operator should be able to see the image in order to determine when a sharp focus has been obtained. A light tight enclosure 47 (except of course for the aperture in member 36) is provided to exclude the possibility of light from any other source reaching photomultiplier tubes 46 and 60.

The red components 42 of beam 28 pass directly through mirror 40 and the blue components 62 are reflected horizontally to the right by mirror 40 as shown. A red filter 44 is placed in the path of the red light 42 to eliminate other colors or frequencies of light which may have passed through mirror 40. Likewise, a blue filter 64 is positioned in the path of the blue light 62 as shown.

The red light passing through filter 44 impinges upon the input of photomultiplier tube 46 and the blue light passing through filter 64 impinges upon the photomultiplier tube 60.

High voltage power supply 52 supplies the photomultiplier tube 46 with power via lead 48 and photomultiplier tube 60 via lead 54, respectively.

The output of photomultiplier tube 46 is conducted over lead 50 to the input of a direct current amplifier 59. Likewise, the output of photomultiplier tube 60 is conducted via lead 56 to the input of a separate direct current amplifier 58.

The outputs of these two direct current amplifiers are impressed over leads 66 and 68, respectively, upon the ratio network 70 in which their relative amplitudes are compared to obtain a signal proportional to the ratio between the outputs of the photomultiplier tubes 60 and 46. Alternative suitable forms for network 70 will be described in detail presently in connection with Figs. 3 and 7, respectively.

The output of ratio network 70 is connected via lead 72 to the Y or vertical deflection terminal of the X-Y recorder 74. The X deflection terminal of recorder 74 is connected via lead 76 to switch 22. Recorder 74 may be a conventional double-input or X, Y, recorder of any of numerous commercially available types. Switch 22 is a double-throw switch by means of which either the output of helipot and battery #1, designated 18, or the output of helipot and battery #2, designated 20, may be selected. A suitable form for these helipots will be described in detail presently in connection with Fig. 6.

Helipot and battery #1 is connected by a mechanical linkage which may, for example, be a flexible cable 17 to knob 16 which controls the horizontal or left to right motion of micromanipulator carriage 14. As will appear from the description of Fig. 6, the output of unit 18 will represent the instantaneous position of carriage 14, and variations in its output will represent changes in position of carriage 14, effected by manually turning knob 16. Similarly, knob 12 is connected by a flexible cable 11 to unit 20. Since knob 12 controls the front to rear positioning of carriage 10, the output of unit 20 will represent the instantaneous position and changes in position of that carriage in a direction perpendicular to the plane of the drawing effected by manually turning knob 12. Automatic means for rotating knobs 12 and 16 in a predetermined systematic manner can obviously be readily devised by those skilled in the art. By way of a specific example of one automatic means for moving the carriages, reference may be had to Patent 2,748,235 to R. L. Wallace, Jr. mentioned hereinabove.

Accordingly, with switch 22 in its upper position, designated 21, recorder 74 will trace a graph representing the variation of the ratio of reflected blue to reflected red light from the specimen as the carriage 14 is moved from left to right. Similarly, with the switch 22 in its lower position, designated 23, recorder 74 will record a graph representing the ratio of blue to red light as carriage 10 is moved perpendicularly with respect to the plane of the drawing, i.e. from front to rear, or vice versa.

As suggested hereinabove, the ratio signal and positional data may, alternatively, be recorded in appropriate memory devices and the information thus provided can be employed to bring specimen 24 into appropriate positions for affixing lead wires to the center points of the terminal coatings on its surface in the manner described, for example, in the above-mentioned patent to R. L. Wallace, Jr.

Figure 2:
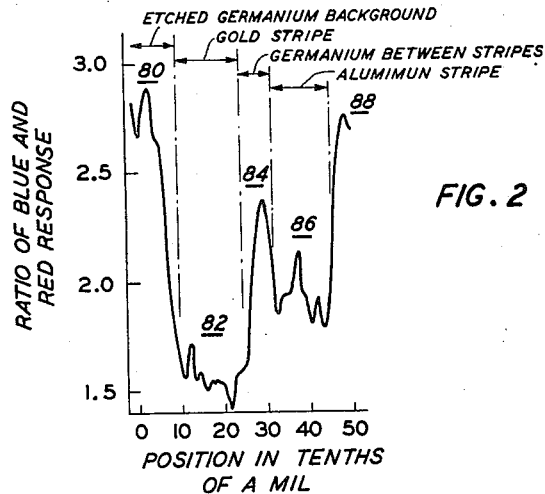
Fig. 2 illustrates the type of response obtained with the system of Fig. 1 in testing a semiconductive element having areas on which stripes of gold and aluminum have been deposited.

In Fig. 2 there is shown a graph obtained by the system of Fig. 1 in tracing across a surface of a semiconductive element consisting of germanium on which two metallic coating stripes, one of gold and one of aluminum, each approximately one mil wide, had been deposited with a separation of approximately four-tenths of a mil between the stripes. Portions 80 and 88 of the graph represent the ratio of blue to red reflected light received from the etched germanium background of the element on opposite sides of the pair of stripes, respectively. Portion 82 represents the ratio with respect to the gold stripe, section 84 represents the ratio with respect to the germanium between the stripes and section 86 represents the ratio with respect to the aluminum stripe, respectively. Abscissa represent the position of the sensing spot from which reflections are instantly being received in tenths of a mil with respect to an arbitrary starting point or "zero position" on the etched germanium background of the specimen. Ordinates represent the ratio of the blue to the red components of the reflected light received as the spot traveled across the stripes and the portions of the surface of the specimen covered by the path followed by the sensing spot.

It is of course apparent that the light beam could be moved to scan specimen 24 along the desired path, or paths, however, it is obviously more convenient to move only the specimen 24.

By employing filters of the same types in several systems, and adjusting the relative gains of the photomultipliers of the systems to be identical, identical ratio signals could be obtained from the several systems for standard color reflecting samples. In other words, systems of the invention can be readily conditioned as testing systems for maintaining the quality of manufacture of numerous articles where the reflecting properties of the articles constitute reliable criteria of quality.

The results obtained may, of course, vary widely with variations in the texture, thickness and uniformity of the metallic deposits and the texture and uniformity of the semiconductive surface. Furthermore, they may be grossly affected if the surface of the germanium and of the stripes are permitted to accumulate any substantial amounts of foreign particles such as dust or other contaminants, and the like.

Figure 3:
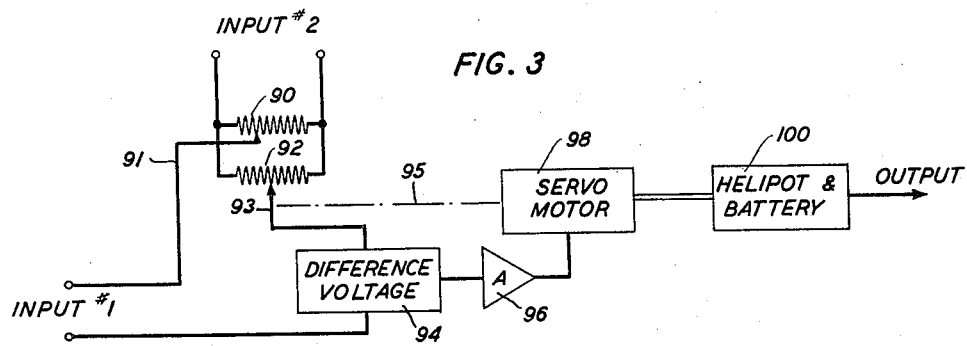
Fig. 3 illustrates in schematic diagram form a ratio network which may be used in the system of Fig. 1.

In Fig. 3 a schematic diagram of one suitable circuit for use as the ratio network 70 of Fig. 1 is shown. In Fig. 3 inputs 1 and 2 are connected to the outputs of the photomultiplier tubes 46 and 60, via amplifiers 59 and 58, respectively, the latter tube 60 being the tube upon which the blue light impinges as shown in Fig. 1. The resistive windings 90 and 92, respectively, of two adjustable potentiometers are shunted across input #2 as shown, the adjustable contacting arms 91 and 93, respectively. Input #1 is connected through the said potentiometer contacting arms as shown and has in series with arm 93 a difference signal voltage device 94. For the initial or zero adjustment of the circuit, arm 93 is placed at the approximate midpoint of potentiometer winding 92. Equal voltages are applied to the inputs #1 and #2 and arm 91 of the upper potentiometer is adjusted along resistance winding 90 until the circuit is balanced, in which case no difference signal voltage will appear across device 94. Device 94 can be a simple resistor. After the initial adjustment as just described, inputs #1 and #2 are connected to the outputs of the direct current amplifiers 59 and 58 of Fig. 1, respectively.

In the event that the potentiometer circuit is thus unbalanced, a voltage will appear across the difference signal device 94, the polarity of which will be dependent upon which side of the actual balance point the arm 93 is instantly situated. The voltage appearing across device 94 is amplified in a direct current amplifier 96 and applied to a servo motor 98 in such manner that the servo motor 98 through a mechanical connection 95 adjusts arm 93 until the potentiometers circuit is balanced and no voltage appears across the device 94. Servo motor 98 also turns the potentiometer in the helipot and battery unit 100 and the voltage output from this latter unit is proportional to the ratio of the blue to the red reflected light. As shown in Fig. 1, this output is applied to the Y or vertical deflecting means of the recorder 74.

Figure 4:
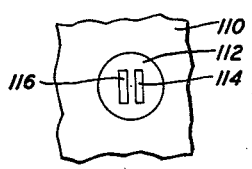
Figs. 4 and 5 are illustrative of semiconductive elements with which the system of Fig. 1 is employed to facilitate obtaining accurate positional information for the attachment of conductive leads.

In Fig. 4 a typical semiconductive element is illustrated which is conveniently processed by the systems of the invention. This element is, of necessity, shown to a greatly enlarged scale but a recitation of its actual dimensions will serve to indicate the problem for the solution of which the intricate system of Fig. 1 has been developed. Element 110 may be a piece of germanium, for example, fifty mils square by five mils thick. If it be assumed that the germanium is of positive or p-type semiconductive material, a thin layer of negative or n-type material is created by "doping" or diffusion in accordance with conventional methods on its upper surface. A raised circular island or mesa 112 is obtained by masking and etching the doped upper surface in accordance with practices well understood in the art, the diameter of the mesa being, for example, eight mils, the upper surface of the mesa being elevated one mil above the remainder of the upper surface of element 110 after etching. The metal stripes or deposits 114 and 116 are, for example, formed on the mesa 112 by evaporation through a mask and subsequent alloying by appropriate heating of the assembly, or by a number of other methods well known to those skilled in the art. Stripes 114 and 116 are of aluminum and gold, respectively. Each is substantially one mil wide. They are parallel to each other, and are separated by a distance of substantially one mil. They are each approximately six mils in length.

Figure 5:
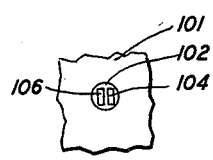

In Fig. 5 an even more minute semiconductive element for use well up into the megacycle frequency range is illustrated and comprises a piece of germanium 101. It can correspond in general to the element of Fig. 4 except that the raised mesa 102 in the center thereof has a diameter of only three mils and the stripes of gold and aluminum, 104 and 106, respectively, are substantially only two mils long by one mil, or less, wide and are separated by a distance of substantially four-tenths of a mil.

Figure 6:
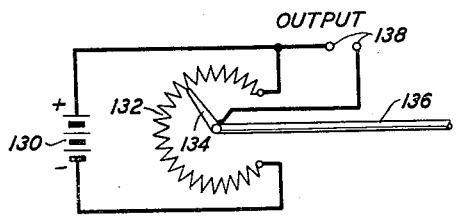
Fig. 6 illustrates in schematic diagram form a helipot and battery combination which may be used in Figs. 1 and 3.

In Fig. 6 a schematic diagram of a helipot and battery suitable for use in Figs. 1 and 3, as the elements 18, 20 and 100, respectively, is shown. It comprises a potentiometer having a resistance winding 132 across which a direct current voltage source, preferably a battery 130, is connected. The adjustable contacting arm 134 is arranged to be turned by a mechanical drive 136 which can conveniently be either a rigid rod or a flexible cable. The electrical output from the combination appears as a voltage at terminals 138, the magnitude of the voltage obviously depending upon the position of the arm 134.

Figure 7:
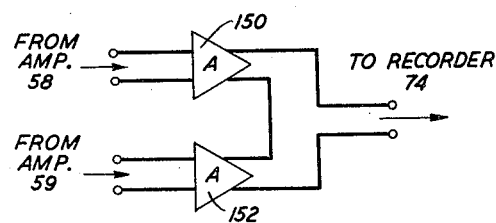
Fig. 7 illustrates in schematic diagram form an alternative circuit which may be used instead of the ratio network of Fig. 3 to provide a signal proportional to the ratio of blue to red reflected components.

In Fig. 7 an alternative form which ratio network 70 may take is shown and comprises simply two logarithmic amplifiers 150 and 152. The input of amplifier 150 is connected to the output of amplifier 58 of Fig. 1 and that of amplifier 152 to the output of amplifier 59 of Fig. 1. The outputs of amplifiers 150 and 152 are connected in series opposing, thus furnishing a signal representing the difference of the logarithms of the two inputs. This signal is of course representative of the ratio between the two inputs and can be supplied to recorder 74 of Fig. 1 (or to a memory device per Wallace Patent 2,748,235 mentioned above). An appropriate form of logarithmic amplifier is described for example at page 935 of the book by Professor F. E. Terman entitled "Radio Engineers Handbook," published by McGraw Hill Company, New York 1943.

The above-described specific illustrative system is susceptible of numerous and varied modifications and rearrangements, all clearly within the spirit and scope of the principles of the present invention, as will at once be apparent to those skilled in the art. No attempt has here been made to exhaustively illustrate all such possibilities.

What is claimed is:

1. Apparatus for determining variations in the character of a reflecting surface, said apparatus comprising means for directing a beam of energy to impinge upon a small area of said surface, said beam of energy including energy components of at least two widely separated frequencies, means for receiving reflections of said beam, the receiving means including an opaque plate with a minute orifice therein and means for focusing an enlarged image of the area of impingement on the opaque plate, means responsive to energy passing through the small orifice of the plate for separating and isolating said two components of widely separated frequency of said received reflected energy, means for determining the amplitude ratio of said components, means for moving the reflecting surface to cause said beam to traverse a predetermined path across said surface, means generating a signal representative of the position of said beam along said path, and means responsive to said last stated means and said ratio determining means to provide a record of the variation of said ratio as said beam traverses said path.

2. A reflection microspectroratiometer probing system for exploring the surface of a small semiconductive element to ascertain the location and extent of metallic coatings applied to said surface, said system comprising means for supporting said element for precisely controllable motion in a predetermined plane, means for generating a beam of energy including energy of at least two appreciably different frequencies, means for directing said energy beam to impinge upon a small area of the surface to be explored, means for isolating energy of said beam reflected from said surface, means for focusing a magnified image of the surface area from which said isolated reflected energy is being received upon the input surface of an opaque member having a small aperture therein, said opaque member lying in a plane normal to said reflected energy, means for moving said element so that the small area from which reflected energy is received is caused to traverse a predetermined path across said element, means for deriving a first control signal which varies in accordance with the position of said spot along said path, means for intercepting the isolated reflected energy emerging from the aperture of said opaque member and directing energy of one frequency region along a path substantially diverging from the path along which energy of an appreciably different frequency region is directed by said means, means in each diverging path for isolating a particular frequency of the energy directed along said path, means for obtaining electrical voltages the amplitudes of which are representative of the respective amplitudes of the isolated frequency components of said frequency regions, means for combining said voltages to obtain a third voltage representing the amplitude ratio between said two isolated frequencies and recording means responsive to said ratio indicating voltage and said first control signal to record data representing the variation in amplitude ratio as said spot traverses said predetermined path.

References Cited in the file of this patent
UNITED STATES PATENTS

| | | |
|---|---|---|
| 2,407,838 | Kliever | Sept. 17, 1946 |
| 2,462,995 | Ritzmann | Mar. 1, 1949 |
| 2,645,971 | Herbst | July 21, 1953 |
| 2,731,878 | Sherwin | Jan. 24, 1956 |
| 2,755,702 | Cook | July 24, 1956 |
| 2,817,265 | Covely | Dec. 24, 1957 |

FOREIGN PATENTS

| | | |
|---|---|---|
| 878,720 | Germany | June 5, 1953 |

UNITED STATES PATENT OFFICE
CERTIFICATION OF CORRECTION

Patent No. 2,938,424            May 31, 1960

Donald R. Herriott

It is hereby certified that error appears in the above numbered patent requiring correction and that the said Letters Patent should read as corrected below.

In the drawings, Sheet 1, FIG 1, for "HELIPOT" read -- POTENTIOMETER --, in the legends associated with the elements bearing designation numbers 18 and 20; Sheet 2, FIG 3, for "HELIPOT" read -- POTENTIOMETER --, in the legend associated with element 100; column 3, line 13, column 4, lines 74 and 75, column 6, line 41, and column 7, line 7 for "helipot", each occurrence, read -- "Helipot" potentiometer --; column 5, line 1, for "helipots" read -- "Helipot" potentiometers --; line 3, for "Helipot" read -- "Helipot" potentiometer --.

Signed and sealed this 24th day of April 1962.

(SEAL)
Attest:

ESTON G. JOHNSON
Attesting Officer

DAVID L. LADD
Commissioner of Patents